(12) United States Patent
Lee et al.

(10) Patent No.: US 7,746,821 B2
(45) Date of Patent: Jun. 29, 2010

(54) APPARATUS AND METHOD FOR MANAGING BANDWIDTH IN BROADBAND WIRELESS ACCESS SYSTEM

(75) Inventors: Jae-Kil Lee, Seoul (KR); Seong-Joon Jeon, Yongin-si (KR); Jun-Hwa Seo, Suwon-si (KR); Myeon-Kee Youn, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 909 days.

(21) Appl. No.: 11/477,910

(22) Filed: Jun. 30, 2006

(65) Prior Publication Data
US 2007/0097936 A1 May 3, 2007

(30) Foreign Application Priority Data
Nov. 2, 2005 (KR) .................. 10-2005-0104509

(51) Int. Cl.
H04W 4/00 (2009.01)
(52) U.S. Cl. ................... 370/328; 370/493; 370/389; 370/395.42; 370/444
(58) Field of Classification Search ............... 370/328, 370/395.4, 395.41, 395.42, 395.43, 395.52, 370/468; 455/450–452.2
See application file for complete search history.

(56) References Cited

U.S. PATENT DOCUMENTS

| | | | |
|---|---|---|---|
| 6,430,196 B1 * | 8/2002 | Baroudi | 370/466 |
| 7,069,211 B2 * | 6/2006 | Chiu et al. | 704/221 |
| 7,230,909 B1 * | 6/2007 | Raissinia et al. | 370/206 |
| 7,483,418 B2 * | 1/2009 | Maurer | 370/354 |
| 2004/0228296 A1 * | 11/2004 | Lenzini et al. | 370/322 |
| 2005/0063330 A1 * | 3/2005 | Lee et al. | 370/328 |
| 2006/0039319 A1 * | 2/2006 | Lee et al. | 370/328 |
| 2006/0098643 A1 * | 5/2006 | Pfeffer et al. | 370/389 |
| 2006/0153119 A1 * | 7/2006 | Ramanna et al. | 370/328 |
| 2006/0239241 A1 * | 10/2006 | Eom et al. | 370/348 |
| 2007/0047553 A1 * | 3/2007 | Matusz et al. | 370/395.42 |
| 2008/0123691 A1 * | 5/2008 | Beser | 370/468 |

* cited by examiner

Primary Examiner—Rafael Přez-Gutiérrez
Assistant Examiner—German Viana Di Prisco
(74) Attorney, Agent, or Firm—H.C. Park & Associates, PLC (57) ABSTRACT

A broadband wireless access system including: a base station that allocates an uplink bandwidth to each connected subscriber station according to at least one algorithm; and at least one subscriber station that when there is no voice information to be sent through the uplink bandwidth allocated from the base station according to an unsolicited grant service (UGS) algorithm, detects another packet based on another algorithm, encapsulates the detected packet, and sends the encapsulated packet in a payload field of a UGS packet to the base station through the uplink bandwidth. Thus, the broadband wireless access system maximizes utilization of the bandwidth allocated according to the UGS algorithm.

14 Claims, 7 Drawing Sheets

APPARATUS AND METHOD FOR MANAGING BANDWIDTH IN BROADBAND WIRELESS ACCESS SYSTEM

CLAIM OF PRIORITY

This application makes reference to, incorporates the same herein, and claims all benefits accruing under 35 U.S.C. §119 from an application for APPARATUS AND METHOD OF PROCESSING BANDWIDTH IN BROADBAND WIRELESS ACCESS SYSTEM earlier filed in the Korean Intellectual Property Office on 2 Nov. 2005 and there duly assigned Serial No. 10-2005-0104509.

BACKGROUND OF THE INVENTION

1. Field of the Invention

The present invention relates to a method and apparatus for managing bandwidth in a broadband wireless access system.

2. Discussion of the Related Art

In line with ongoing growth of the Internet user population accompanied by increasing interest in broadband wireless communication, the Institute of Electrical and Electronics Engineers (IEEE) 802.16 broadband wireless access (BWA) system has emerged to satisfy the demands of users for communication service with the high quality of a wired environment in a wireless environment.

IEEE 802.16 standardizes a broadband wireless communication system that can provide not only high-speed broadband data communication service but also high-speed voice communication service to users through high-speed broadband communication.

In the broadband wireless communication system, a plurality of subscriber stations connect to one base station through a downlink channel and an uplink channel between the base station and each subscriber station.

The downlink channel is classified into a pilot channel, a broadcast channel, a traffic channel, and a traffic control channel. The traffic channel is further classified into a burst traffic channel, a dedicated traffic channel, and a signaling channel.

The uplink channel is classified into an access channel and a traffic channel. The access channel is further classified into a channel for accessing an uplink according to a contention-based method, and a channel for accessing an uplink according to a contention-free method. The traffic channel is further classified into a burst traffic channel, a dedicated traffic channel and a signaling channel.

According to a broadcast method, the broadband wireless access (BWA) system uses the downlink channel through which a signal is sent from the base station to each subscriber station. And, the base station of the broadband wireless access (BWA) system allocates an uplink bandwidth to each subscriber station, so that the broadband wireless access (BWA) system uses the uplink channel through which a signal is sent from each subscriber station to the base station.

The efficiency with which the uplink bandwidth is utilized is one of the most important factors affecting quality of service (QoS) in the broadband wireless access (BWA) system.

SUMMARY OF THE INVENTION

It is an object of the present invention to provide a method and apparatus for managing bandwidth in a broadband wireless access (BWA) system, the method and apparatus maximizing utilization efficiency of an uplink bandwidth allocated to each subscriber station from a base station.

According to an exemplary embodiment of the present invention, there is provided a broadband wireless access (BWA) system comprising a base station that allocates an uplink bandwidth to each connection of each subscriber station connected with the base station according to at least one algorithm; and at least one subscriber station that when there is no packet to be sent through the uplink bandwidth allocated according to a first algorithm from the base station, sends a packet based on a second algorithm to the base station through the uplink bandwidth.

The first algorithm according to the present invention maybe an unsolicited grant service (UGS) algorithm.

The second algorithm according to the present invention may be at least one of a real-time polling service (rtPS) algorithm, a non-real-time polling service (nrtPS) algorithm and a best effect (BE) algorithm.

The subscriber station according to the present invention may be allocated an uplink bandwidth according to the UGS algorithm from the base station, detect voice input of a user, and when it is in a mute state in which voice is not input, send the packet according to the rtPS algorithm, nrtPS algorithm, or BE algorithm to the base station through a bandwidth of the mute state that is a part of the uplink bandwidth.

The subscriber station may encapsulate a packet, the packet being based on one of the algorithms other than the UGS algorithm, include the encapsulated packet in the payload field of a UGS packet, indicate that the UGS packet includes an encapsulated packet, and send the UGS packet to the base station through the bandwidth of the mute state.

The subscriber station may indicate in one of a plurality reserve fields of a header of the UGS packet that an encapsulated packet is included.

The base station according to the present invention may analyze the header of the UGS packet received from the subscriber station, and when an encapsulated packet is included in the payload field, decapsulate the encapsulated packet, and send the decapsulated packet to a network according to included connection identifier (CID) information.

According to another exemplary embodiment of the present invention, there is provided a subscriber station comprising at least two queues that separately store packets to be sent according to each of a UGS algorithm, an rtPS algorithm, an nrtPS algorithm, and a BE algorithm; a voice processor that, when the subscriber station is connected with the base station according to the UGS algorithm, detects whether or not voice is input; and a packet processor that, when voice is not detected by the voice processor, encapsulates one of the packets stored in the queues, the packet being based on the rtPS algorithm, nrtPS algorithm, or BE algorithm, includes the encapsulated packet in a payload field of a UGS packet, and sends the UGS packet through an uplink bandwidth allocated according to the UGS algorithm.

The packet processor according to the present invention may select the packet to be sent in order of the rtPS algorithm, nrtPS algorithm and BE algorithm.

The packet processor may indicate that CID information based on the UGS algorithm and an encapsulated packet are included in the Generic Media access control Header (GMH) of the UGS packet, and include CID information based on the corresponding algorithm in the GMH of the encapsulated packet.

According to still another exemplary embodiment of the present invention, there is provided a base station comprising a bandwidth allocator that allocates an uplink bandwidth based on at least one algorithm according to a request message received from a subscriber station; and a packet analyzer that analyzes the Generic Media access control Header (GMH) of a first packet received through the allocated bandwidth, and when an encapsulated second packet is included in a payload field, decapsulates the encapsulated second packet and sends the decapsulated second packet to a network according to the CID information of the second packet.

According to yet another exemplary embodiment of the present invention, there is provided a bandwidth management method of a broadband wireless access (BWA) system including a base station and a plurality of subscriber stations, the bandwidth management method comprising the steps of: at the base station, allocating an uplink bandwidth to each subscriber station according to at least one algorithm; at a subscriber station, when there is no first packet to be sent according to the UGS algorithm, selecting a second packet to be sent according to an algorithm other than the UGS algorithm; encapsulating the second packet, including the second packet in a payload field of the first packet, and indicating in the GMH of the first packet that the encapsulated second packet is included; sending the first packet to the base station through a bandwidth allocated according to the UGS algorithm; at the base station, analyzing the GMH of the first packet received through the bandwidth based on the UGS algorithm, and when the second packet is included, decapsulating the second packet; and sending the decapsulated second packet to a network according to CID information included in the GMH of the second packet.

The bandwidth management method of the broadband wireless access (BWA) system may further comprise the steps of when the subscriber station is connected with the base station according to the UGS algorithm, detecting whether or not voice is input from a user; and when voice is not input, judging that there is no first packet to be sent according to the UGS algorithm.

In the step of selecting the second packet, whether or not there is a packet to be sent may be checked in order of an rtPS algorithm, an nrtPS algorithm, and a BE algorithm, and the second packet may be selected according to the same priority order.

In the step of indicating that the second packet is included in the first packet, it may be indicated in one of the reserve fields of a Generic Media access control Header (GMH) of the first packet that the second packet is included.

According to yet another exemplary embodiment of the present invention, there is provided a bandwidth management method of a subscriber station included in a broadband wireless access (BWA) system, the method comprising the steps of: being allocated an uplink bandwidth for each connection from a base station according to the UGS algorithm; detecting voice information input by a user, and when voice is not input, selecting a packet based on at least one of an rtPS algorithm, an nrtPS algorithm and a BE algorithm; and encapsulating the selected packet, including the encapsulated packet in a payload field of a UGS packet based on the UGS algorithm, and sending the UGS packet to the base station through one bandwidth.

The bandwidth management method may further comprise the steps of sending the UGS packet including the voice information input by the user to the base station through another bandwidth, and indicating that an encapsulated packet is included in one field of the UGS packet.

According to yet another exemplary embodiment of the present invention, there is provided a bandwidth management method of a base station included in a broadband wireless access (BWA) system, the method comprising the steps of allocating an uplink bandwidth based on the UGS algorithm to at least one subscriber station; analyzing a Generic Media access control Header (GMH) of a packet received through the bandwidth, and when the GMH indicates an encapsulated packet is included, decapsulating the encapsulated packet, and sending the decapsulated packet to a network according to included CID information.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Hereinafter, exemplary embodiments of the present invention will be described in detail with reference to the accompanying drawings. Matters related to the present invention and well-known in the art will not be described in detail when deemed that such description would detract from the clarity and concision of the disclosure.

Figure 1:
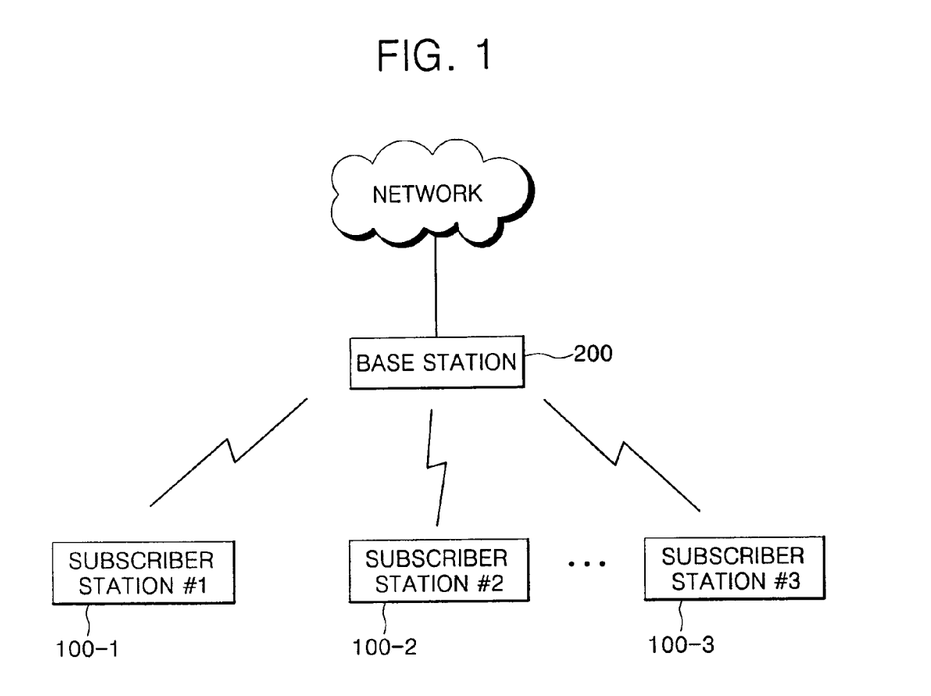
FIG. 1 is a block diagram of a broadband wireless access system according to an exemplary embodiment of the present invention.

FIG. 1 is a block diagram of a broadband wireless access (BWA) system according to an exemplary embodiment of the present invention.

Referring to FIG. 1, a base station 200 is connected with a plurality of subscriber stations 100 and a network.

The base station 200 and each subscriber station 100 are connected according to an orthogonal frequency division multiplexing (OFDM) scheme, an orthogonal frequency division multiplexing access (OFDMA) scheme, or a time division multiple access (TDMA) scheme, and exchange packets through an allocated bandwidth.

The broadband wireless access (BWA) system supports an uplink scheduling algorithm for guaranteeing quality of service (QoS) between the base station 200 and each subscriber station 100. In other words, the base station 200 allocates an uplink bandwidth to each connection according to a scheduling algorithm based on a service provided between the base station 200 and each subscriber 200.

The uplink scheduling algorithm can be an unsolicited grant service (UGS) algorithm, a real-time polling service (rtPS) algorithm, a non-real-time polling service (nrtPS) algorithm, and a best effort (BE) algorithm.

The UGS algorithm is for providing a service such as a voice communication service according to voice over Internet protocol (VoIP), the service being very sensitive to data transmission time delay. According to the UGS algorithm, the base station 200 continuously guarantees that each subscriber station 100 is allocated a uniform bandwidth.

According to the UGS algorithm, the allocation period and the size of an uplink bandwidth are set up according to negotiation between a subscriber station 100 and the base station 200 when the subscriber station 100 is first connected with the base station 100. When the negotiation is completed, the base station 200 continuously guarantees that the subscriber station 100 is allocated a negotiated uplink bandwidth even though there is no additional request from the subscriber station 100.

The rtPS algorithm is for providing a service of transmitting video data such as a video stream. According to the rtPS algorithm, the base station 200 variably allocates an uplink bandwidth to a subscriber station 100.

While, according to the UGS algorithm, the base station 200 continuously and periodically guarantees the uplink bandwidth of each subscriber station 100, according to the rtPS algorithm, a subscriber station 100 continuously requests a bandwidth according to the capacity of data to be sent and the base station 200 variably allocates the bandwidth requested from the subscriber station 100.

The nrtPS algorithm is for providing a service such as a file transfer protocol (FTP) service that is not sensitive to data transmission time delay. According to the nrtPS algorithm, while the base station 200 and a subscriber station 100 are connected, the subscriber station 100 continuously sends a bandwidth request message to the base station 200 and the base station 200 allocates a requested bandwidth to the subscriber station 100.

The BE algorithm is for providing a service such as a web service that is not sensitive to data transmission time delay and performs discreet burst data transmission. According to the BE algorithm, whenever data to be sent is generated from an upper application, a subscriber station 100 requests the base station 200 to allocate a required uplink bandwidth and sends the data through a bandwidth allocated to each connection by the base station 100.

For example, when the broadband wireless access (BWA) system provides a voice communication service, the base station 200 allocates an uplink bandwidth based on interval information and bandwidth information to each subscriber station 100 according to the UGS algorithm, reflects the uplink bandwidth on an uplink map, and sends the uplink map to each subscriber station 100. Here, the interval information and bandwidth information are included in a request message that is contentiously received from each subscriber station 100.

Then, each subscriber station 100 checks an uplink bandwidth that is invariably allocated thereto through the uplink map received from the base station 100, and sends a packet to the base station 200 through the allocated uplink bandwidth.

The subscriber station 100 of the broadband wireless access (BWA) system can access the base station 200 according to at least one algorithm and provide various services simultaneously.

Figure 2:
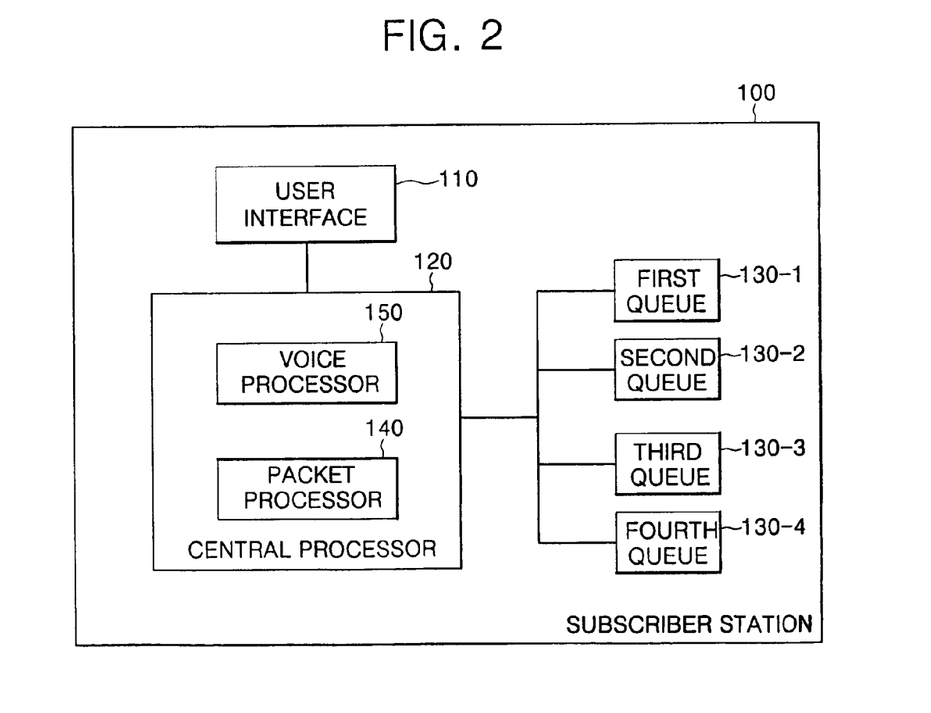
FIG. 2 is a block diagram of a subscriber station according to an exemplary embodiment of the present invention.

FIG. 2 is a block diagram of the subscriber station according to an exemplary embodiment of the present invention.

Referring to FIG. 2, the subscriber station 100 according to the present invention includes a user interface 110, a central processor 120, and a plurality of queues 130 (shown here as queues 130-1 through 130-4). The central processor 120 includes a voice processor 150 and a packet processor 140. In addition, the subscriber station 100 further includes an interface (not shown in drawings) that wirelessly connects with the base station 200 and exchanges packets.

The user interface 110 may include an output (not shown in the drawings) that outputs sound signals, a microphone (not shown in the drawings) that receives voice and provides a sound signal, and a display (not shown in the drawings) that displays images, providing various services such as voice communication and data communication to a user through a broadband wireless access (BWA) system.

The queues 130 temporarily store packets based on the uplink algorithms, respectively. Specifically, each queue 130 temporarily stores a packet to be sent to the base station 200 according to an uplink algorithm, and the subscriber station 100 sends the packets that are temporarily stored in the queues 130 to the base station 200 in order of the algorithms.

For example, a first queue 130-1 temporarily stores a UGS packet according to the UGS algorithm, a second queue 130-2 temporarily stores an rtPS packet according to the rtPS algorithm, a third queue 130-3 temporarily stores an nrtPS packet according to the nrtPS algorithm, and a fourth queue 130-4 temporarily stores a BE packet according to the BE algorithm. The priority order of each queue 130 is set up according to the priority order of each uplink algorithm.

The central processor 120 wirelessly connects with the base station 200 according to at least one uplink algorithm and exchanges packets.

For example, when the user requests the voice communication service, the central processor 120 sends a request message to the base station 200 according to the UGS algorithm and temporarily stores a UGS packet in the first queue 130-1, the UGS packet including voice that the user inputs. And, the central processor 120 sends the UGS packet to the base station 200 through an uplink bandwidth that is allocated according to an uplink map received from the base station 100, the UGS packet being temporarily stored in the first queue 130-1.

In addition, when the central processor 120 is connected with the base station 200 according to the rtPS algorithm, nrtPS algorithm and BE algorithm, it temporarily stores packets based on each algorithm in the corresponding queues 130 and sends the packets temporarily stored in each queue 130 through an uplink bandwidth allocated from the base station 100.

When the subscriber station 100 is connected with the base station 200 according to the UGS algorithm, i.e., if a real-time service such as a voice communication service is provided, the voice processor 150 detects whether or not a sound signal is received from the user interface 110. When a sound signal is not received, the voice processor 150 sends a mute signal to the packet processor 140.

In other words, similar to a voice activity detection (VAD) function supported by a voice codec G.711, the voice processor 150 detects whether or not the voice of the user is input, and when the voice is not input, sends the mute signal.

When the mute signal is received from the voice processor 150, i.e., when in a mute state in which voice of the user is not input, the packet processor 140 checks whether or not a packet is stored in a queue 130 other than the first queue 130-1 in which the UGS packet based on the UGS algorithm is stored.

Here, the packet processor 140 checks whether or not a packet is stored according to the priority order set up for each queue 130-2 through 130-4. When a packet is temporarily stored in one or more of queues 130-2 through 130-4, the packet processor 140 sends the packet (or packets in priority order) to the base station 200 through the uplink bandwidth of the mute state that is a part of the uplink bandwidth allocated according to the UGS algorithm, the mute state meaning that voice of the user is not input.

Figure 3:
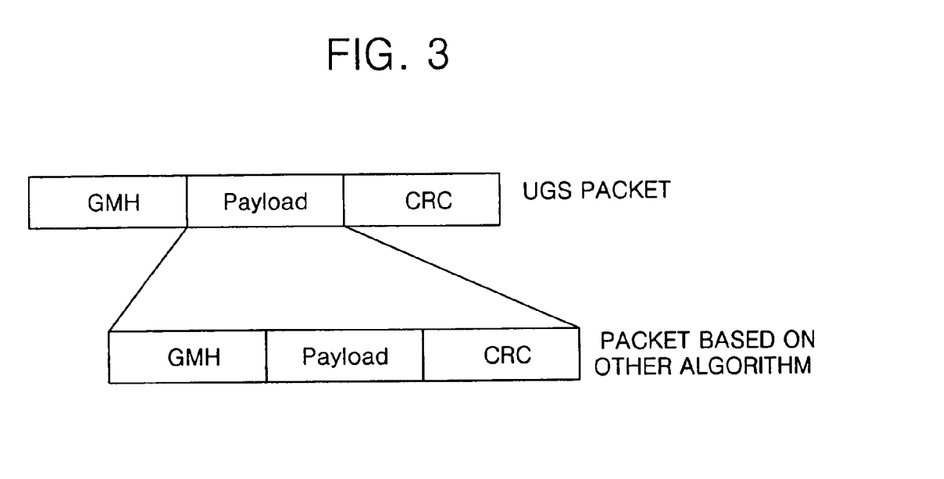
FIG. 3 is a diagram illustrating a packet transmitted according to the present invention.
Figure 4:
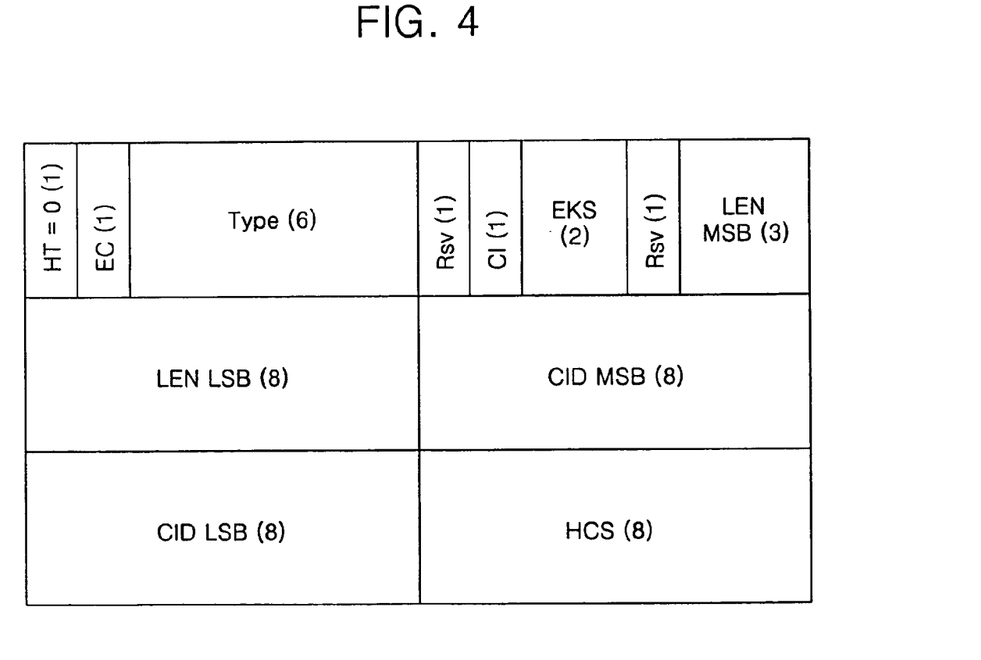
FIG. 4 is a diagram illustrating a GMH shown in FIG. 3.

FIG. 3 is a diagram illustrating a packet transmitted according to the present invention, and FIG. 4 is a diagram illustrating a Generic Media access control Header (GMH) shown in FIG. 3.

A detailed description of each field of the packet is provided in Institute of Electrical and Electronics Engineers (IEEE) 802.16, and thus will not be given here.

As illustrated in FIGS. 3 and 4, the packet that is exchanged in a broadband wireless access (BWA) system includes a Generic Media access control Header (GMH) field, a payload field and a cyclic redundancy check (CRC) field. The GMH also includes an encryption control (EC) field, a connection identifier (CID) field and a plurality of reserve (Rsv) fields.

When a mute signal is received from the voice processor 150, i.e., when in a mute state in which voice is not input to the subscriber station 100, the packet processor 140 checks whether or not a packet is temporarily stored in a queue 130 other than the first queue 130-1.

Then, the packet processor 140 encapsulates a packet stored in a queue 130 other than the first queue 130-1, and includes the encapsulated packet in the payload field of a UGS packet based on the UGS algorithm.

Here, the packet processor 140 includes CID information based on the UGS algorithm in the GMH of the UGS packet, sets one of Rsv fields included in the GMH of the UGS packet to '1,' and thus specifies that an encapsulated packet is included in the payload field. In other words, the packet processor 140 can indicate that a packet based on another algorithm is included in the payload field.

The CID information based on the UGS algorithm is included in the GMH of the UGS packet, and CID information based on another uplink algorithm of the corresponding packet is included in the GMH of the corresponding packet based on the other uplink algorithm, the corresponding packet based on the other uplink algorithm being included in the payload field of the UGS packet.

In other words, when the base station 200 and a subscriber station 100 are connected according to the algorithms, each connection based on an algorithm is allocated a particular CID. Therefore, the subscriber station 100 includes the corresponding CID information in the encapsulated packet that is included in the payload field of the UGS packet based on the UGS algorithm.

Figure 5:
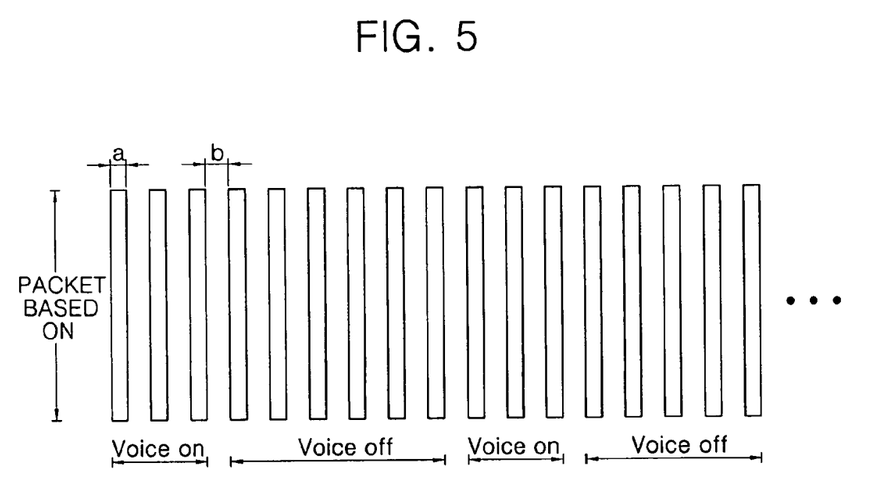
FIG. 5 is a diagram illustrating an uplink bandwidth allocated according to a UGS algorithm.

FIG. 5 is a diagram illustrating an uplink bandwidth allocated according to the UGS algorithm.

As illustrated in FIG. 5, the base station 200 continuously guarantees an interval (b) and a bandwidth (a) that are fixed according to a request message received from each subscriber station 100.

For about 35% of a total time, a subscriber station 100 sends a packet through an uplink bandwidth. In other words, utilizing approximately 35% of the uplink bandwidth, a subscriber station 100 sends a UGS packet through the allocated bandwidth. The uplink bandwidth utilization percentage can be estimated with particulars of general voice communication, and is a rough value that was calculated by actually measuring uplink bandwidth utilization percentages.

The subscriber station 100 detects whether or not voice is input from a user. When in a mute state (Voice off), the subscriber station 100 checks whether or not a packet based on an algorithm other than the UGS algorithm is temporarily stored in the queues 130 in order of priority. When a packet is temporarily stored in a queue 130, the subscriber station 100 encapsulates the packet and includes the encapsulated packet in the payload field of a UGS packet based on the UGS algorithm, as illustrated in FIG. 3.

For example, when a BE packet based on the BE algorithm is temporarily stored in the fourth queue 130-4 in the mute state (Voice off), the subscriber station 100 includes CID information based on the BE algorithm in the GMH of the BE packet, encapsulates the BE packet, and includes the encapsulated BE packet in the payload field of a UGS packet.

Then, the subscriber station 100 sends the UGS packet including the BE packet to the base station 200 through a bandwidth of the mute state which is a part of the uplink bandwidth. In other words, the subscriber station 100 sends the BE packet to the base station 200 through the uplink bandwidth allocated according to the UGS algorithm.

Figure 6:
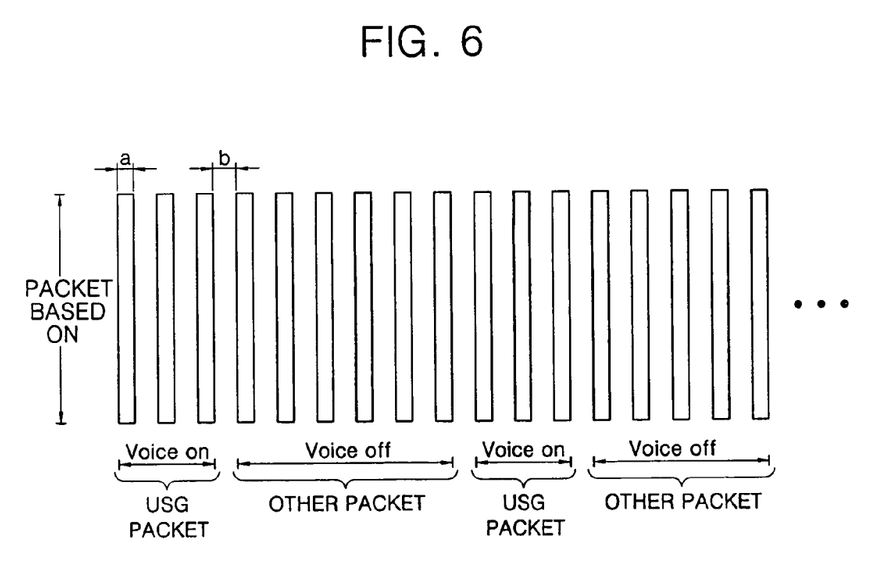
FIG. 6 is a diagram illustrating bandwidth use based on the UGS algorithm according to the present invention.

FIG. 6 is a diagram illustrating bandwidth use based on the UGS algorithm according to the present invention.

As illustrated in FIG. 6, when voice is input from a user (Voice on), the subscriber station 100 sends a voice packet, i.e., a UGS packet, to the base station 200 through an allocated uplink bandwidth. On the contrary, when voice is not input from a user (Voice off), the subscriber station 100 sends another UGS packet to the base station 200 through the uplink bandwidth, the other UGS packet including an encapsulated packet of an uplink algorithm other than the UGS algorithm.

Thus, utilization of the uplink bandwidth can be maximized when the uplink bandwidth is allocated according to the UGS algorithm.

Here, the subscriber station 100 sends a packet to the base station 200 in order of the priority of each algorithm. For example, according to the priority order that is set up in order of the UGS algorithm, rtPS algorithm, nrtPS algorithm and BE algorithm, the subscriber station 100 sends a packet to the base station 100.

Figure 7:
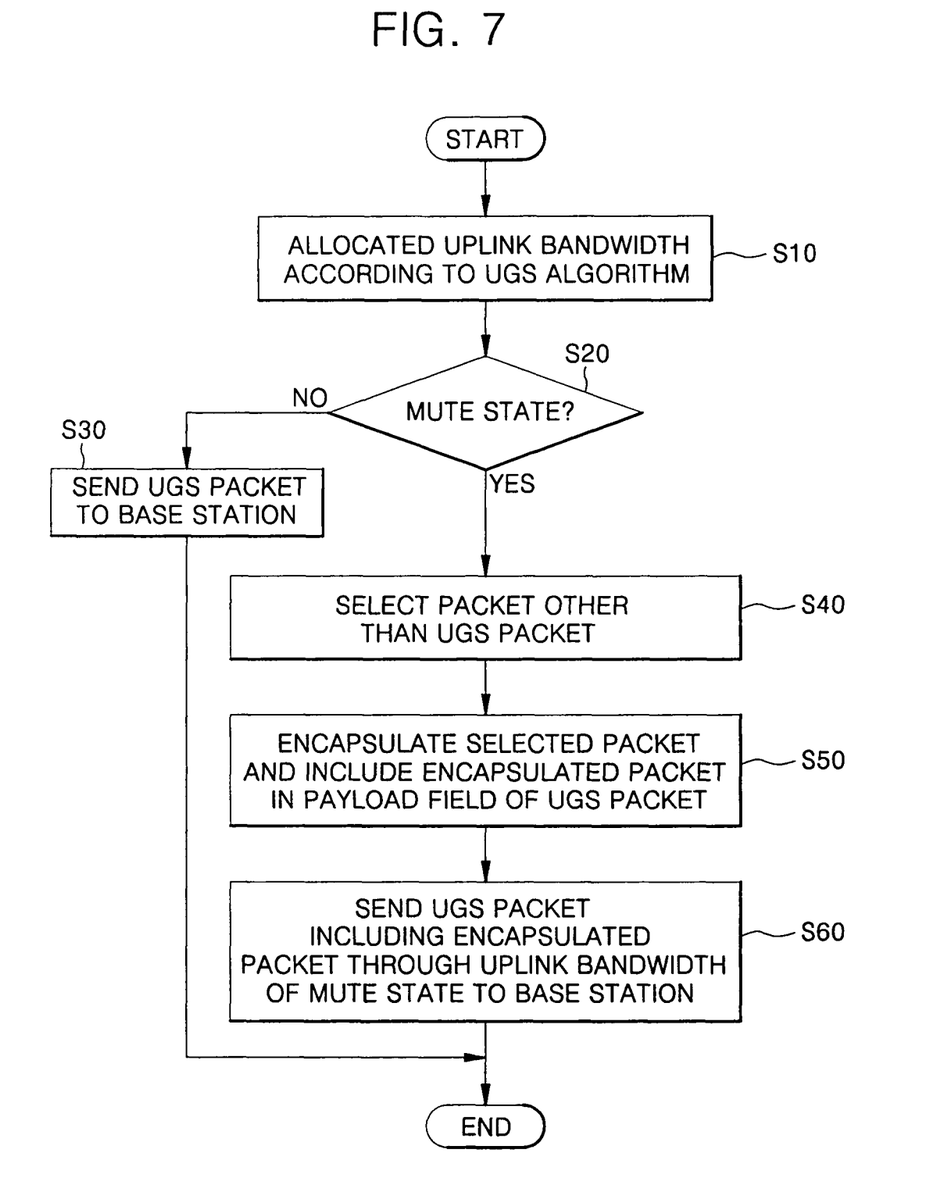
FIG. 7 is a flowchart showing a bandwidth management method of the subscriber station according to an exemplary embodiment of the present invention.

FIG. 7 is a flowchart showing a bandwidth management method of the subscriber station according to an exemplary embodiment of the present invention.

Referring to FIG. 7, the subscriber station 100 is allocated an uplink bandwidth for each connection from the base station 200 according to, e.g., the UGS algorithm (S10).

Subsequently, when the subscriber station 100 is allocated an uplink bandwidth for each connection from the base station 200 according to the UGS algorithm, the subscriber station 100 detects whether or not voice of a user is input. That is the subscriber station 100 detects a mute state (S20). When not the mute state (voice is input), the subscriber station 100 sends a first UGS packet including the input voice to the base station 200 through the allocated bandwidth (S30).

When no voice is input, i.e., when in the mute state, the subscriber station 100 checks whether or not a packet other than a UGS packet is temporarily stored therein and selects a packet of a higher priority among the temporarily stored packets (S40). Here, in order of an rtPS packet, nrtPS packet and BE packet, the subscriber station 100 checks whether or not a packet is temporarily stored.

Subsequently, the subscriber station 100 encapsulates the selected packet and includes the encapsulated packet in the payload field of a second UGS packet (S50).

The subscriber station 100 includes CID information based on the UGS algorithm in a header (GMH) of the second UGS packet, sets one of Rsv fields in the header (GMH of the second UGS packet) to '1,' thereby specifying that an encapsulated packet is included in the payload field. Then, the subscriber station 100 includes CID information based on one of the other algorithms in the GMH of a that algorithm's packet, e.g., CID information based on the BE algorithm in the GMH of a BE packet.

Next, the subscriber station 100 sends the second UGS packet including the encapsulated packet to the base station 200 through the bandwidth of the mute state, which is a part of the allocated uplink bandwidth (S60). In other words, the subscriber station 100 sends the BE packet to the base station 200 through the bandwidth of the mute state, which is a part of the uplink bandwidth allocated according to the UGS algorithm.

Figure 8:
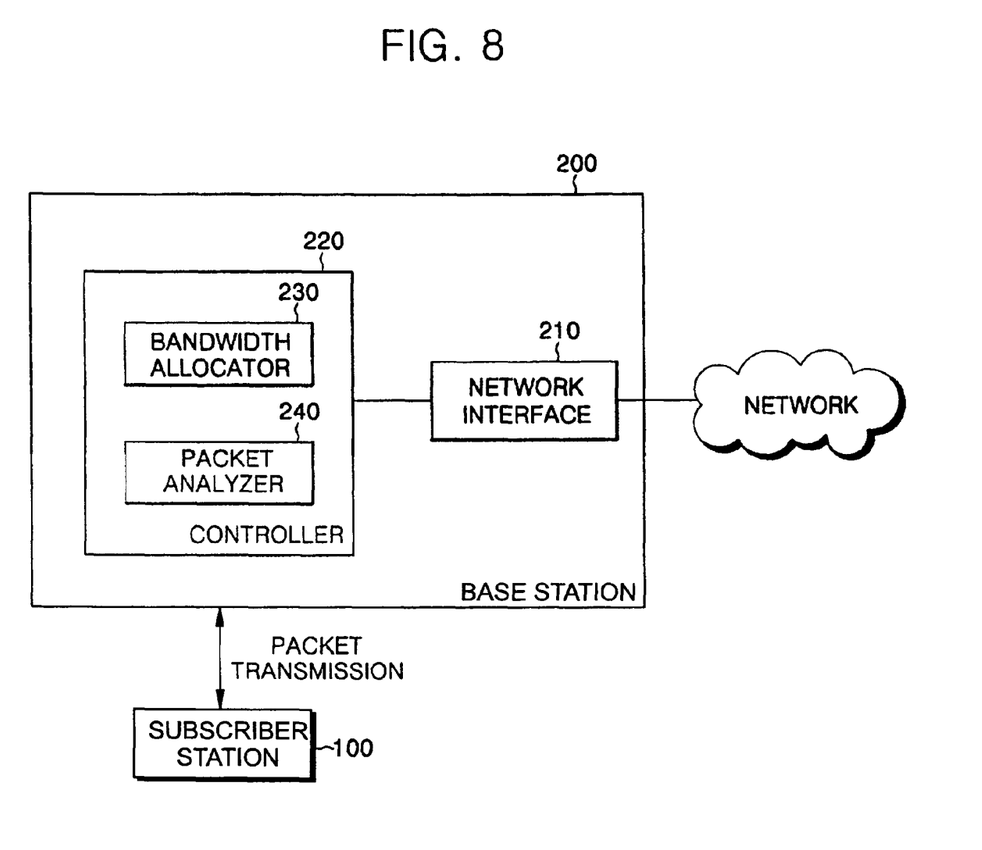
FIG. 8 is a block diagram illustrating a base station according to an exemplary embodiment of the present invention.

FIG. 8 is a block diagram illustrating a base station according to an exemplary embodiment of the present invention.

Referring to FIG. 8, a base station 200 includes a controller 220 and a network interface 210, the controller 220 including a bandwidth allocator 230 and a packet analyzer 240.

The controller 220 allocates a bandwidth for each CID of each subscriber station 100 according to a request message received from the subscriber station 100, reflects the bandwidths on an uplink map, and sends information about the allocated uplink bandwidths to the subscriber stations 100.

In addition, the controller 220 analyzes a packet received from each subscriber station 100 through the allocated uplink bandwidth and sends the packet to a network, or sends a packet received from the network to each subscriber station 100 through a downlink bandwidth.

The bandwidth allocator 230 allocates the bandwidths according to the request message received from each subscriber station 100 and an uplink algorithm of the subscriber station 100. For example, when the bandwidth allocator 230 allocates an uplink bandwidth to a subscriber station 100 according to the UGS algorithm, it allocates an uplink bandwidth of a fixed size at stated periods according to interval information and size information included in a request message.

The packet analyzer 240 analyzes the GMH of a packet received from a subscriber station 100, thereby checking whether or not an encapsulated packet is included in the payload field. Specifically, the packet analyzer 240 checks whether or not one of the Rsv fields of the header (GMH) of the UGS packet is set to '1', and when one of the Rsv fields is set to '1', decapsulates the packet included in the payload field.

Also, the packet analyzer 240 sends the decapsulated packet to the network through the network interface 210 according to the CID information of the decapsulated packet.

Figure 9:
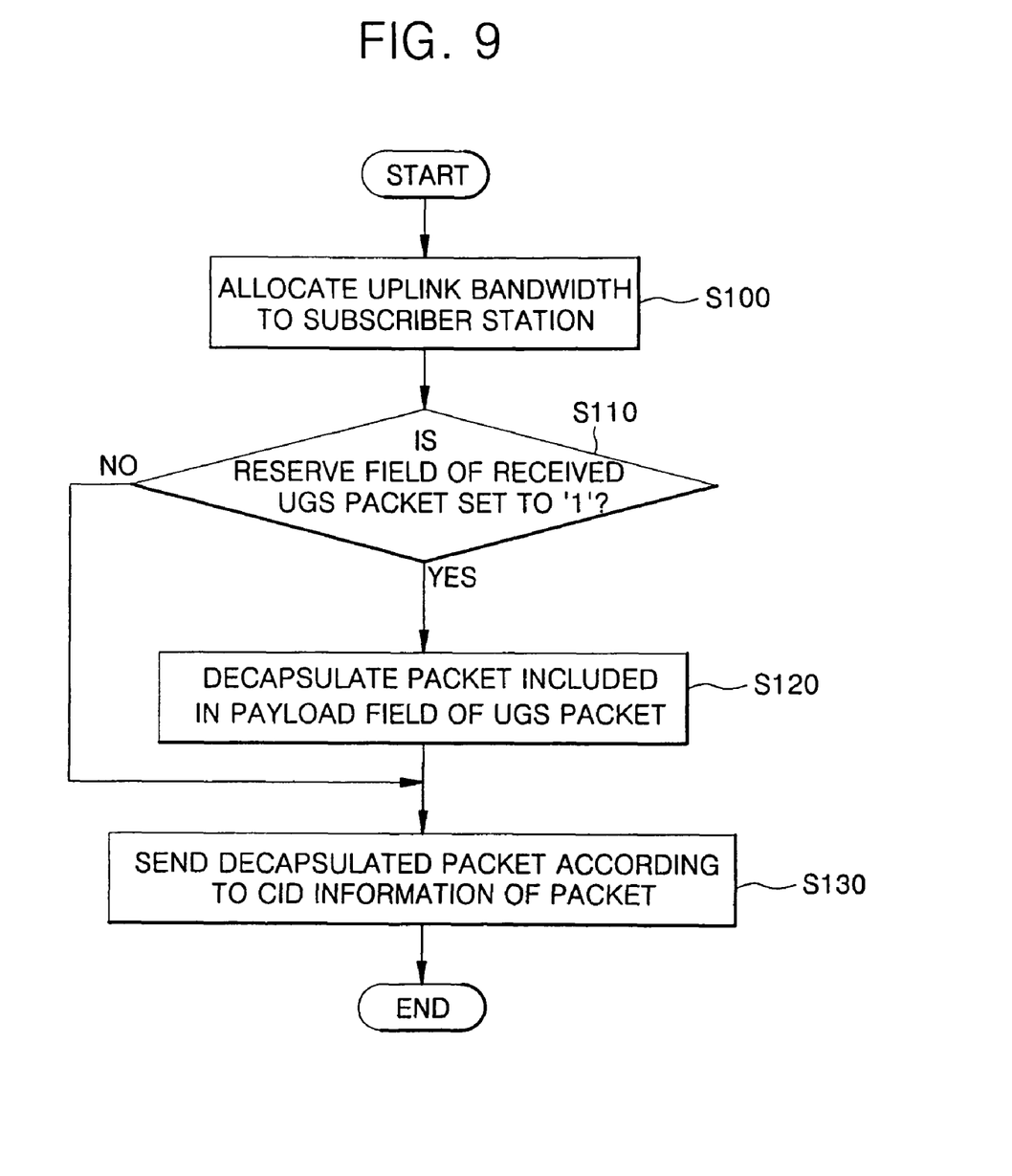
FIG. 9 is a flowchart showing a packet processing method of the base station according to an exemplary embodiment of the present invention.

FIG. 9 is a flowchart showing a packet processing method of a base station according to an exemplary embodiment of the present invention.

Referring to FIG. 9, the base station 200 allocates an uplink bandwidth according to a request message based on each connection and received from a subscriber station 100 (S100). For example, the base station 200 allocates an uplink bandwidth based on the UGS algorithm according to a request message received from the subscriber station 100.

Subsequently, the base station 200 analyzes the GMH of a packet received through the uplink bandwidth allocated to the subscriber station 100, thereby checking whether or not an encapsulated packet is included in the payload field (S110). Specifically, the base station 200 checks whether or not one of the Rsv fields of the header (GMH) of the received UGS packet is set to '1.'

When none of the Rsv fields of the UGS packet are set to '1,' the base station 200 sends the packet to a network according to CID information included in the GMH (S130).

When one of the Rsv field of the UGS packet is set to '1,' the base station 200 decapsulates the packet included in the payload field (S120). Subsequently, the base station 200 sends the decapsulated packet to the network according to CID information included in the GMH of the decapsulated packet (S130).

For example, the base station 200 sends a BE packet to the network according to CID information based on the BE algorithm, the BE packet being included in the payload field of the UGS packet received through the uplink bandwidth allocated according to the UGS algorithm. In other words, the base station 200 processes the BE packet received through the uplink bandwidth allocated according to the UGS algorithm.

Figure 10:
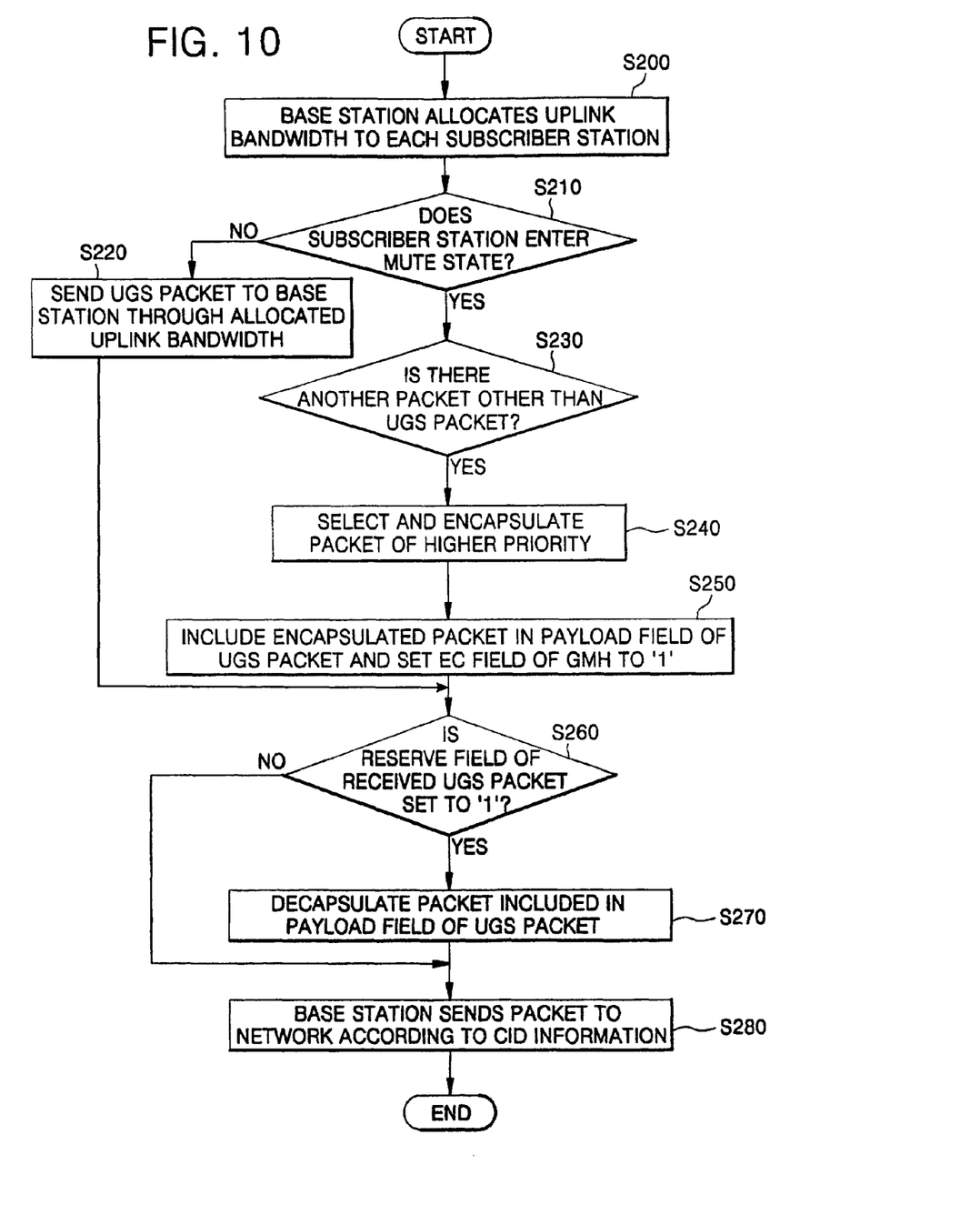
FIG. 10 is a flowchart showing a bandwidth management method of a broadband wireless access system according to the present invention.

FIG. 10 is a flowchart showing a bandwidth management method of a broadband wireless access (BWA) system according to the present invention.

Referring to FIG. 10, the base station 200 allocates uplink bandwidths according to request messages received from each subscriber station 100, reflects the bandwidths on an uplink map, and sends the uplink map to each subscriber station 100 (S200).

Here, the base station 200 allocates a CID according to algorithms of each subscriber station 100 according to which the base station 200 and the subscriber station 100 are connected.

When a subscriber station 100 is connected with the base station 200 according to the UGS algorithm, it checks whether or not voice is input from a user (S210). In other words, the subscriber station 100 checks if it is in a mute state.

When voice is input, the subscriber station 100 sends a first UGS packet through the allocated uplink bandwidth (S220).

On the other hand, when the subscriber station 100 shifts to the mute state in which voice is not input, it checks whether or not a packet other than a UGS packet is temporarily stored therein (S230).

Here, in order of an rtPS packet, nrtPS packet and BE packet, the subscriber station 100 checks whether or not a packet other than a UGS packet is temporarily stored.

The subscriber station 100 selects a packet of a higher priority, e.g., a BE packet, among the temporarily stored packets, includes CID information based on the BE algorithm in the GMH of the BE packet, and encapsulates the BE packet (S240).

Subsequently, the subscriber station 100 includes the encapsulated BE packet in the payload field of a second UGS packet, sets one of the Rsv fields of the GMH of the second UGS packet to '1,' and sends the second UGS packet to the base station 200 (S250). In other words, the subscriber station 100 specifies in an Rsv field of the GMH of the second UGS packet that an encapsulated packet is included.

The base station 200 checks whether or not one of the Rsv fields in the GMH of the received (first or second) UGS packet is set to '1' (S260).

When one of the Rsv fields of the UGS packet is set to '1,' the base station 200 decapsulates the BE packet included in the payload field (S270).

Then, the base station 200 sends the BE packet to a network according to the CID information included in the GMH of the BE packet (S280).

On the other hand, when none of the Rsv fields of the UGS packet are set to '1,' the base station 200 sends the first UGS packet to the network according to CID information (S280).

Described above is a case where a packet according to an uplink algorithm other than the UGS algorithm is sent through the bandwidth of a mute state, which is a part of an uplink bandwidth allocated according to the UGS algorithm. In the same manner, however, the present invention can be applied to other cases where other packets are sent through an unused bandwidth that is a part of an allocated uplink bandwidth.

As described above, the present invention enables utilization efficiency of an uplink bandwidth that is invariably allocated according to the UGS algorithm in a broadband wireless access (BWA) system to be maximized.

While the present invention has been described with reference to exemplary embodiments thereof, it will be understood by those skilled in the art that various changes in form and detail may be made therein without departing from the scope of the present invention as defined by the following claims.

What is claimed is:

1. A broadband wireless access system comprising:
a base station allocating an uplink bandwidth to each connection of each subscriber station connected with the base station according to at least one algorithm; and
at least one subscriber station, when there is no packet to be sent through the uplink bandwidth allocated from the base station according to a first algorithm, sending a packet according to a second algorithm to the base station through the uplink bandwidth, wherein, when the subscriber station is allocated the uplink bandwidth from the base station according to an unsolicited grant service (UGS) algorithm, the subscriber station detects whether or not voice of a user is input, and when voice is not input, sends the packet, based on a real-time polling service (rtPS) algorithm, a non-real-time polling service (nrtPS) algorithm, or a best effort (BE) algorithm, to the base station through a bandwidth of a mute state which is a part of the uplink bandwidth, wherein, when voice is not input, the subscriber station encapsulates the packet, the packet being based on one of the algorithms other than the UGS algorithm, includes the encapsulated packet in a payload field of a UGS packet, provides an indication that the encapsulated packet is included in the UGS packet, and sends the UGS packet to the base station through the bandwidth of the mute state.

2. The broadband wireless access system of claim 1, wherein the first algorithm is an unsolicited grant service (UGS) algorithm.

3. The broadband wireless access system of claim 1, wherein the second algorithm is at least one of a real-time polling service (rtPS) algorithm, a non-real-time polling service (nrtPS) algorithm, and a best effort (BE) algorithm.

4. The broadband wireless access system of claim 1, wherein the subscriber station provides an indication in a reserve field of a header of the UGS packet to indicate that the encapsulated packet is included in the payload field of the UGS packet.

5. The broadband wireless access system of claim 4, wherein the base station analyzes the header of the UGS packet received from the subscriber station, and when it is indicated that an encapsulated packet is in the payload field, decapsulates the encapsulated packet and sends the decapsulated packet to a network according to included connection identifier (CID) information.

6. A subscriber station of a broadband wireless access system, comprising:
at least two queues separately storing packets to be sent according to an unsolicited grant service (UGS) algorithm, a real-time polling service (rtPS) algorithm, a non-real-time polling service (nrtPS) algorithm, and a best effort (BE) algorithm;
a voice processor, when the subscriber station is connected with a base station according to the UGS algorithm, detecting whether or not voice is input; and
a packet processor, when voice is not detected by the voice processor, encapsulating one of the packets based on the rtPS algorithm, nrtPS algorithm, or BE algorithm that are separately stored in the queues, including the encapsulated packet in a payload field of a UGS packet, and sending the UGS packet including the encapsulated packet through an uplink bandwidth allocated according to the UGS algorithm.

7. The subscriber station of claim 6, wherein the packet processor selects the packet to be sent in order of the rtPS algorithm, nrtPS algorithm and BE algorithm.

8. The subscriber station of claim 6, wherein the packet processor specifies that connection identifier (CID) information based on the UGS algorithm and an encapsulated packet are included in a Generic Media access control Header (GMH) of the UGS packet including the encapsulated packet, and includes, in the GMH, CID information based on the corresponding rtPS algorithm, nrtPS algorithm or BE algorithm of the encapsulated packet.

9. A method for managing a bandwidth in a broadband wireless access system including a base station and a plurality of subscriber stations, the method comprising the steps of:
allocating, at the base station, an uplink bandwidth to each of the subscriber stations according to at least one algorithm;
when the subscriber station is connected with the base station according to an unsolicited grant service (UGS) algorithm, detecting, at the subscriber station, whether or not voice is input from a user;
when voice is not input, judging that there is no first packet to be sent according to the UGS algorithm
when there is no first packet to be sent according to the UGS algorithm, selecting, at the subscriber station, a second packet to be sent according to an algorithm other than the UGS algorithm;
encapsulating the second packet, including the encapsulated second packet in a payload field of a UGS packet, and providing an indication in a Generic Media access control Header (GMH) of the UGS packet that the encapsulated second packet is included;
sending the UGS packet to the base station through the bandwidth allocated according to the UGS algorithm;
analyzing, at the base station, the GMH of the UGS packet received through the bandwidth based on the UGS algorithm, and when it is determined that the encapsulated second packet is included in the UGS packet, decapsulating the encapsulated second packet; and
according to connection identifier (CID) information included in a GMH of the second packet, sending the decapsulated second packet from the base station to a network.

10. The method of claim 9, the step of selecting the second packet further comprising:
checking, in order of a real-time polling service (rtPS) algorithm, a non-real-time polling service (nrtPS) algorithm and a best effect (BE) algorithm, whether or not there is the second packet to be sent, and the second packet is selected in the same order of algorithms.

11. The method of claim 9, the step of providing an indication that the second packet is included in the UGS packet comprises providing such an indication in one of at least two reserve fields of the GMH of the UGS packet.

12. A method for managing a bandwidth in a subscriber station included in a broadband wireless access system, the method comprising the steps of:
being allocated an uplink bandwidth for each connection from a base station according to an unsolicited grant service (UGS) algorithm;
detecting voice information input from a user, and when voice is not input, selecting a packet based on at least one of a real-time polling service (rtPS) algorithm, a non-real-time polling service (nrtPS) algorithm, and a best effort (BE) algorithm; and encapsulating the selected packet, including the encapsulated packet in a payload field of a UGS packet based on the UGS algorithm, and sending the UGS packet including the encapsulated packet to the base station through the allocated uplink bandwidth.

13. The method of claim 12, further comprising the steps of:

when voice is input, sending a UGS packet including voice information input from the user to the base station through the allocated uplink bandwidth; and when voice is not input, providing an indication, in one of a plurality of reserve fields in a Generic Media access control Header (GMH) of the UGS packet that includes the encapsulated second packet, that the encapsulated packet is included.

14. The method of claim 13, further comprising the steps of:

processing received packets at the base station included in the broadband wireless access system, the step of processing comprising the steps of:

allocating an uplink bandwidth based on the UGS algorithm to at least one said subscriber station;

analyzing the GMH of the received packet, and when it is determined that an encapsulated packet is included in the payload filed of the received packet, decapsulating the encapsulated packet; and sending the decapsulated packet to a network according to connection identifier (CID) information included in a GMH of the decapsulated packet.

* * * * *